(12) United States Patent
Chen

(10) Patent No.: US 10,358,294 B2
(45) Date of Patent: Jul. 23, 2019

(54) COLLAPSIBLE CONVEYOR RACK

(71) Applicant: KEYARROW (TAIWAN) CO., LTD., Taichung (TW)

(72) Inventor: Fu-Yi Chen, Taichung (TW)

(73) Assignee: KEYARROW (TAIWAN) CO., LTD., Taichung (TW)

( * ) Notice: Subject to any disclaimer, the term of this patent is extended or adjusted under 35 U.S.C. 154(b) by 0 days.

(21) Appl. No.: 15/793,255

(22) Filed: Oct. 25, 2017

(65) Prior Publication Data
US 2018/0118466 A1  May 3, 2018

(30) Foreign Application Priority Data

Oct. 27, 2016 (TW) .............................. 105134868 A

(51) Int. Cl.
*B65G 21/10* (2006.01)
*B65G 21/06* (2006.01)
*B65G 41/00* (2006.01)

(52) U.S. Cl.
CPC ............. *B65G 21/10* (2013.01); *B65G 21/06* (2013.01); *B65G 41/008* (2013.01); *B65G 2207/00* (2013.01); *B65G 2812/02029* (2013.01)

(58) Field of Classification Search
CPC .................................................... B65G 21/10
See application file for complete search history.

(56) References Cited

U.S. PATENT DOCUMENTS

| 4,245,732 A | * | 1/1981 | Couperus | B65G 21/14 198/313 |
| 2002/0060077 A1 | * | 5/2002 | Biolley | E21B 17/015 166/350 |
| 2016/0137422 A1 | * | 5/2016 | Husar | B65G 21/10 299/39.2 |

FOREIGN PATENT DOCUMENTS

CN     203781674 U  *  8/2014

* cited by examiner

*Primary Examiner* — Gene O Crawford
*Assistant Examiner* — Lester Ill Rushin
(74) *Attorney, Agent, or Firm* — Muncy, Geissler, Olds & Lowe, P.C.

(57) ABSTRACT

A collapsible conveyor rack for supporting a conveyor is disclosed to include a bottom rack unit including a frame body and a pivot connector, a folding unit including a pivot connector pivotally connected to the pivot connector of the bottom rack unit for allowing biasing of the folding unit relative to the bottom rack unit and a retractable portion connected to the pivot connector of the folding unit, a retracting unit including a retractable portion coupled to and retractable relative to the retractable portion of the folding unit, and a driving mechanism for moving the retracting unit relative to the folding unit.

10 Claims, 6 Drawing Sheets

COLLAPSIBLE CONVEYOR RACK

BACKGROUND OF THE INVENTION

1. Field of the Invention

The present invention relates to conveyor technology and more particularly, to a collapsible conveyor rack.

2. Description of the Related Art

The conveyor racks of conventional conveyor systems are not folding collapsible, so they occupy a large space in the transportation. There are known folding collapsible conveyor systems. However, the structures of these collapsible conveyor systems are too simple. Further, the conveyors of these folding collapsible conveyor systems can be stretched and deformed in the collapsing operation, or can interfere with the collapsing operation. Further, the other structures are too complicated, and not easy to collapse.

Therefore, convention collapsible conveyor racks are still not satisfactory in function, and have room for improvement.

SUMMARY OF THE INVENTION

The present invention has been accomplished under the circumstances in view. It is the main object of the present invention to provide a collapsible conveyor rack, which facilitates quick collapsing, significantly reduces the collapsed dimension, and effectively avoids component deformation or interference in the collapsing operation.

To achieve this and other objects of the present invention, the invention provides a collapsible conveyor rack for supporting a conveyor. The collapsible conveyor rack comprises a bottom rack unit comprising a frame body and a pivot connector, a folding unit comprising a pivot connector pivotally connected to the pivot connector of the bottom rack unit for allowing biasing of the folding unit relative to the bottom rack unit and a retractable portion connected to the pivot connector of the folding unit, a retracting unit comprising a retractable portion coupled to and retractable relative to the retractable portion of the folding unit, and a driving mechanism for moving the retracting unit relative to the folding unit.

Thus, by means of the relative retractable relationship between the folding unit and the retracting unit, the collapsible conveyor rack can be conveniently and rapidly collapsible to reduce the dimension. Further, the conveyor can be kept in a loosened status, avoiding the problem of stretching deformation of the conveyor or conveyor interference in the collapsing operation.

Preferably, the collapsible conveyor rack further comprises a locking mechanism for locking the retracting unit to the folding unit.

Preferably, the collapsible conveyor rack further comprises a cover plate covering the folding unit.

Preferably, the bottom rack unit further comprises at least one receiving support bar mounted at the frame body for supporting the retracting unit.

Preferably, each receiving support bar comprises a notch. Further, the retracting unit comprises a screw hole, and a screw bolt threaded into the screw hole to lock the retracting unit to the notch of each receiving support bar.

Thus, the invention uses the driving mechanism for quick adjustment of the relative position between the folding unit and the retracting unit, the locking mechanism for locking the retracting unit to the folding unit, and the at least one receiving support bar for supporting the retracting unit positively in position to achieve the expected effects.

Other advantages and features of the present invention will be fully understood by reference to the following specification in conjunction with the accompanying drawings, in which like reference signs denote like components of structure.

DETAILED DESCRIPTION OF THE INVENTION

Figure 1:
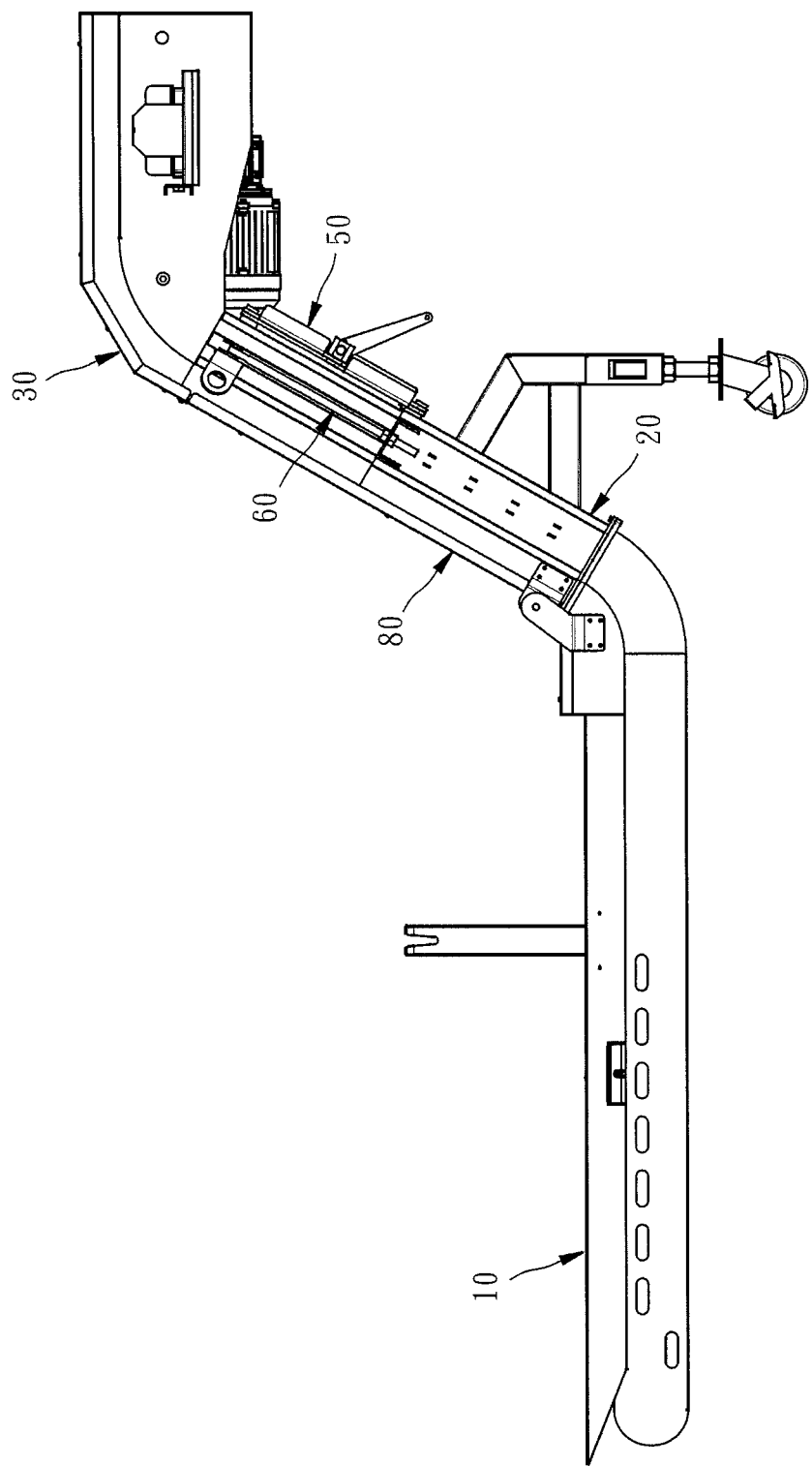
FIG. 1 is a sectional side view of a collapsible conveyor rack in accordance with the present invention.
Figure 2:
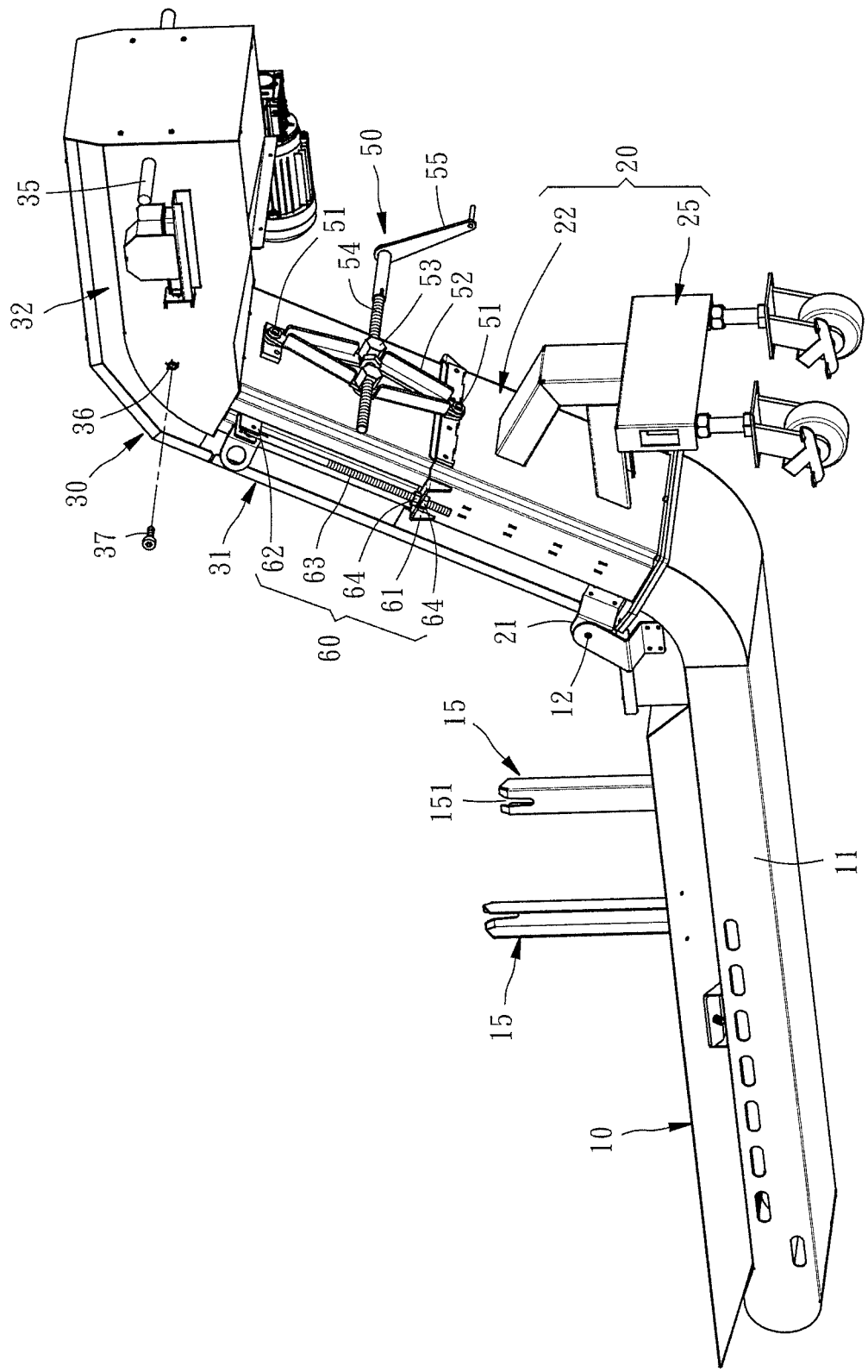
FIG. 2 is an oblique top elevational view of the collapsible conveyor rack in accordance with the present invention.
Figure 3:
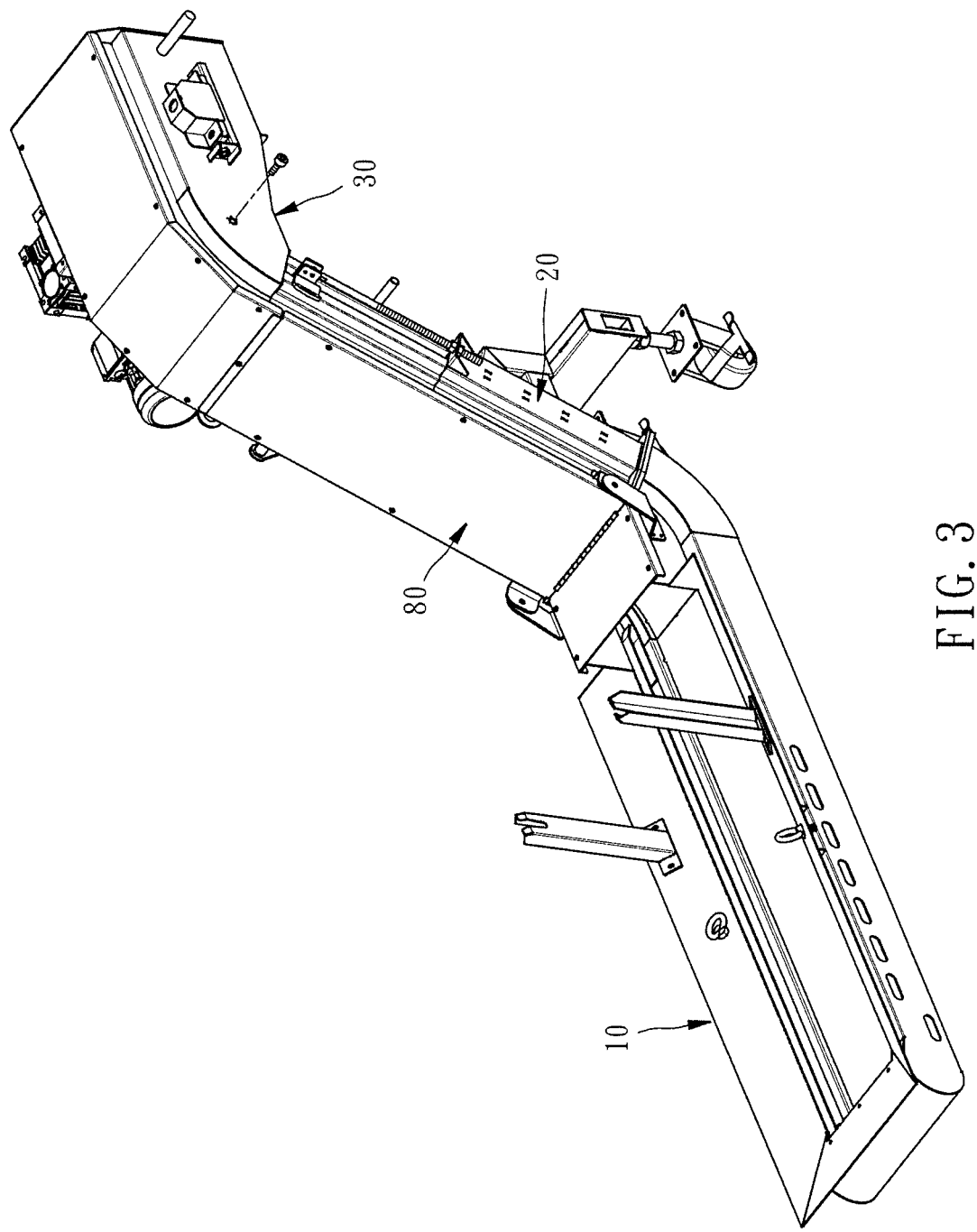
FIG. 3 corresponds to FIG. 2 when viewed from another angle.

Referring to FIGS. 1-3, the present invention provides a collapsible conveyor rack for supporting a conveyor (not shown) that can be a chain-driven or belt-driven conveyor.

The collapsible conveyor rack comprises a bottom rack unit 10, a folding unit 20, a retracting unit 30, a driving mechanism 50, a locking mechanism 60 and a cover plate 80.

The bottom rack unit 10 comprises a frame body 11, a pivot connector 12 located at one end of the frame body 11, a pulley 13 for linking the conveyor, an abutment portion 14, and two receiving support bars 15 mounted at the bottom rack unit 10.

The folding unit 20 comprises a pivot connector 21 pivotally connected to the pivot connector 12 of the bottom rack unit 10 for allowing the folding unit 20 to be biased relative to the bottom rack unit 10, a retractable portion 22 connected to the pivot connector 21, and an abutment portion 24 for abutment against the abutment portion 14 of the bottom rack unit 10.

The folding unit 20 further comprises a support frame 25 supporting the retractable portion 22.

The retracting unit 30 comprises a retractable portion 31 retractably movable with the retractable portion 22 of the folding unit 20, an extension portion 32 connected to the retractable portion 31, a pulley 33 for linking the conveyor, and two grips 35 for gripping to collapse the conveyor rack.

The receiving support bars 15 are adapted for supporting the retracting unit 30.

Each receiving support bar 15 has a notch 151. The retracting unit 30 further comprises a screw hole 36, and a screw bolt 37 threaded into the screw hole 36 and supported in the notches 151 of the receiving support bars 15.

The aforesaid conveyor is mounted to the bottom rack unit 10, the folding unit 20 and the retracting unit 30, having two opposite ends thereof respectively coupled to the pulley 13 of the bottom rack unit 10 and the pulley 33 of the retracting unit 30.

The bottom rack unit 10, the folding unit 20 and the retracting unit 30 each define therein a conveyor groove for accommodating and guiding the conveyor.

The driving mechanism 50 is adapted for driving the folding unit 20 and retracting unit 30 to move relative to each other. The driving mechanism 50 comprises two locating members 51 respectively fixedly mounted at the folding unit 20 and the retracting unit 30, two pairs of actuating arms 52 respectively pivotally connected to the locating members 51, two screw nuts 53 respectively pivotally connected between the two pairs of actuating arms 52, a screw rod 54 threaded into respective screw holes 531 of the screw nuts 53, and a rotary handle 55 connected to the screw rod 54.

The locking mechanism 60 is adapted for locking the folding unit 20 and the retracting unit 30. The locking mechanism 60 comprises a first locating member 61 fixedly mounted at the folding unit 20, a second locating member 62 fixedly mounted at the retracting unit 30, a locking rod 63 having one end thereof pivotally connected to the second locating member 62 and an opposite end thereof terminating in a threaded shank 631, and two screw nuts 64 for threading onto the threaded shank 631 of the locking rod 63 to lock the locking rod 63 to the first locating member 61.

The cover plate 80 is pivotally connected to the bottom rack unit 10 for covering the folding unit 20 and the retracting unit 30.

When collapsing the collapsible conveyor rack, unfasten the screw nuts 64 of the locking mechanism 60 to unlock the locking rod 63 from the first locating member 61, allowing relative movement between the folding unit 20 and the retracting unit 30.

Thereafter, operate the rotary handle 55 of the driving mechanism 50 to rotate the screw rod 54 in moving the two screw nuts 53 toward each other, causing the actuating arms 52 to move the respective pairs of locating members 51, and thus, the folding unit 20 and the retracting unit 30 are retracted.

Thus, the collapsible conveyor rack of the present invention can be easily and rapidly collapsed to reduce the dimension. Further, since the folding unit 20 and the retracting unit 30 are retractable relative to each other, the conveyor can be loosened, facilitating collapsing the conveyor rack, avoiding the problem of stretching deformation of the conveyor or conveyor interference in the collapsing operation as seen in the prior art design.

Figure 4:
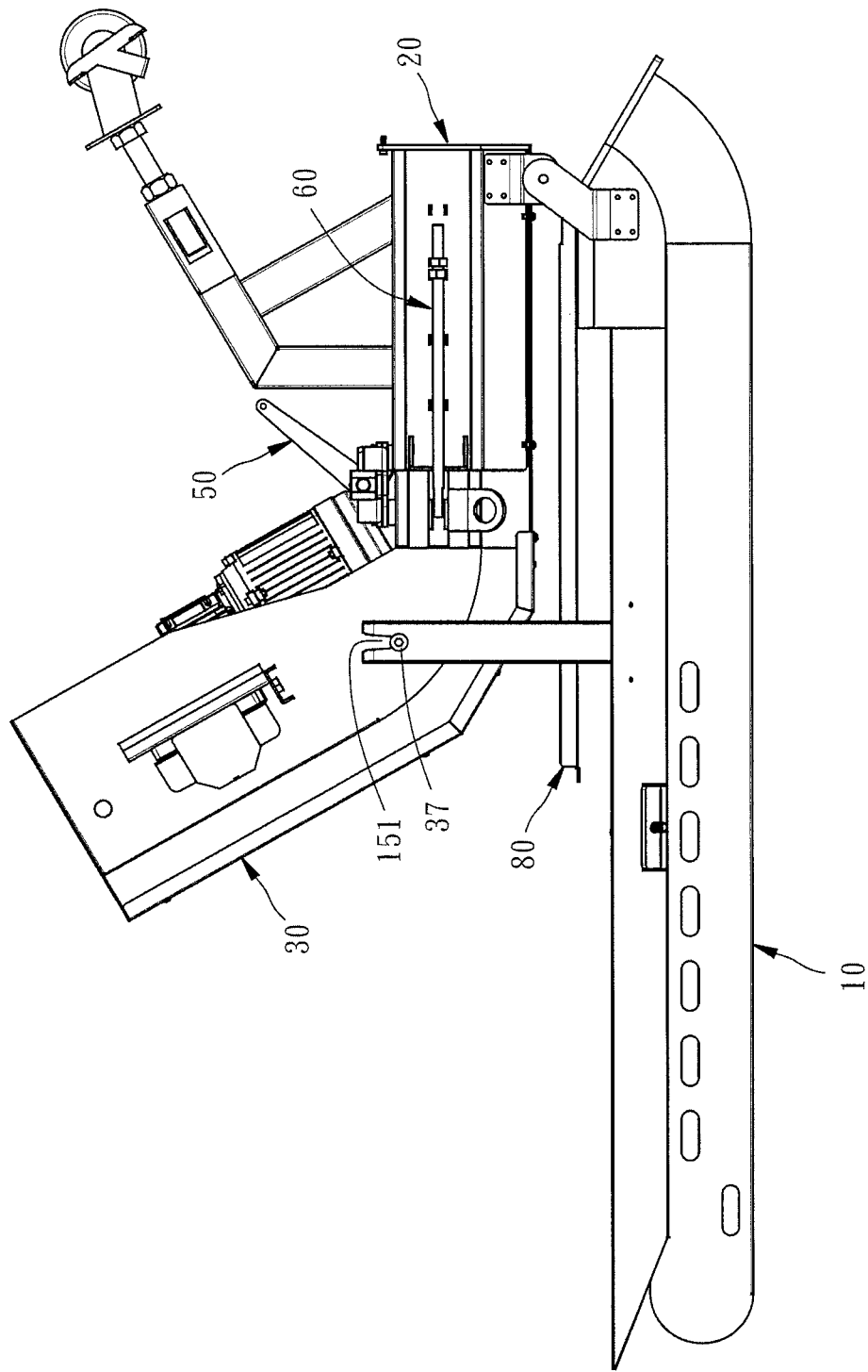
FIG. 4 is a side view of the present invention, illustrating the collapsible conveyor rack collapsed.
Figure 5:
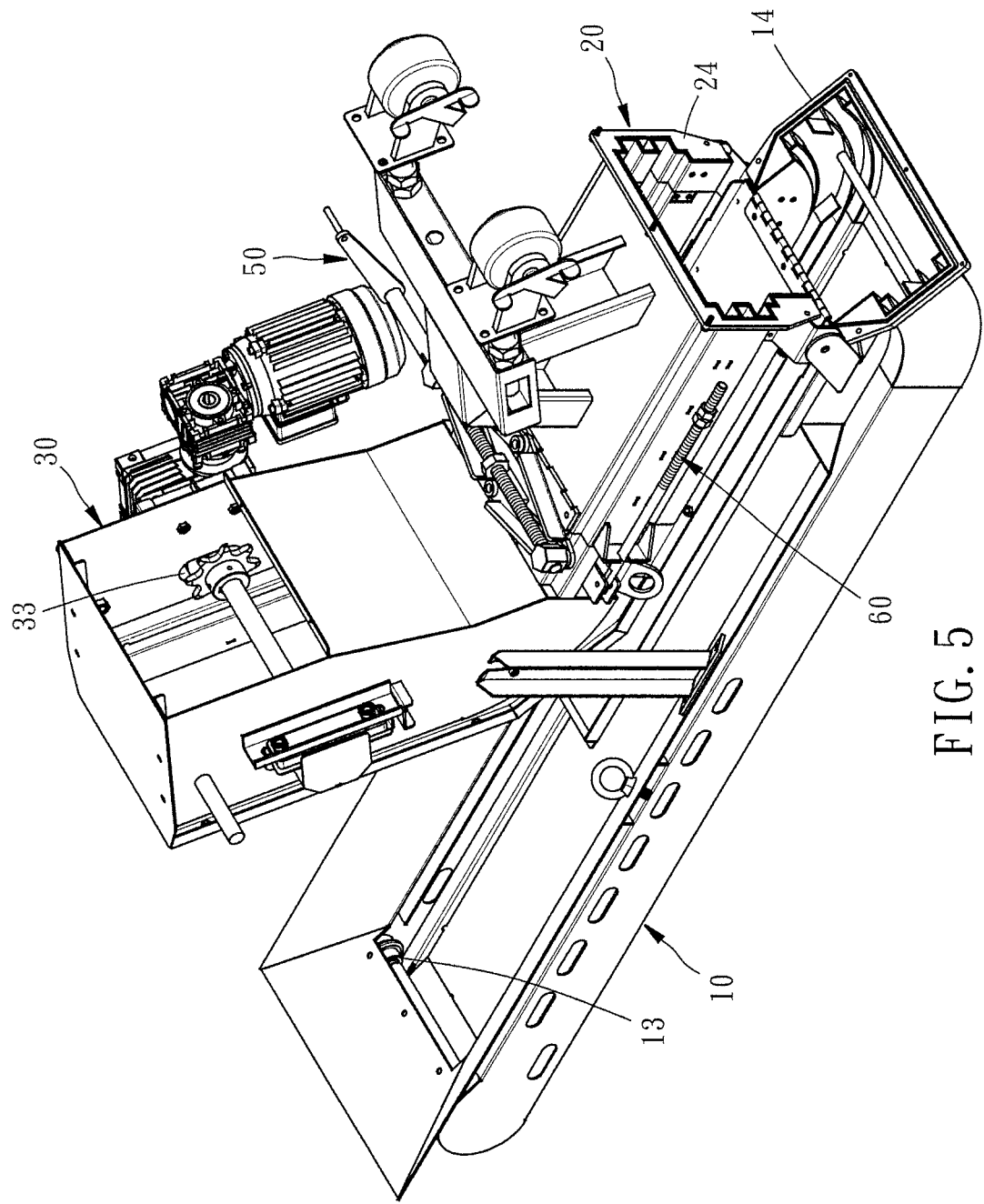
FIG. 5 is an oblique top elevational view of the present invention, illustrating the collapsible conveyor rack collapsed.
Figure 6:
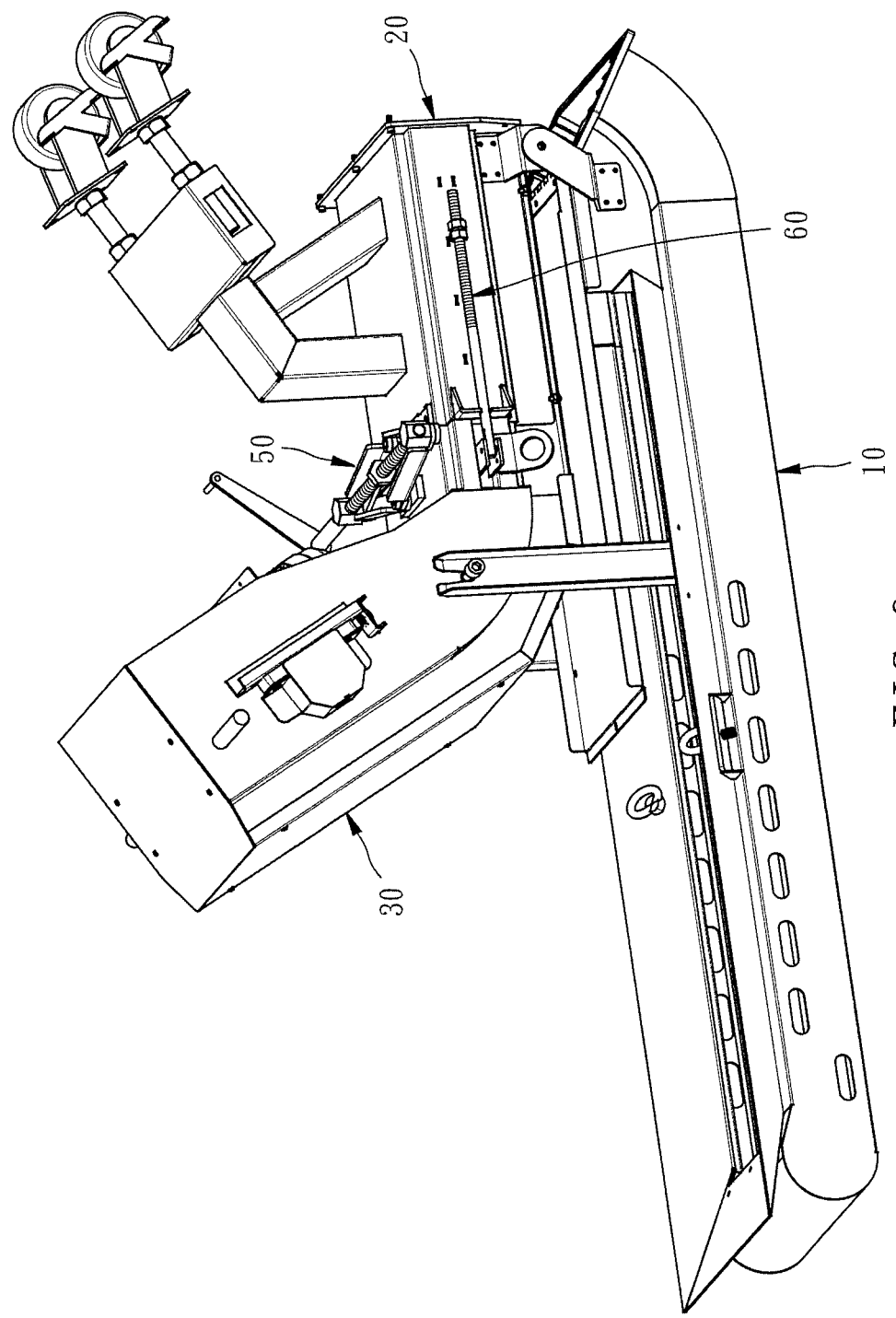
FIG. 6 corresponds to FIG. 5 when viewed from another angle.

FIGS. 4-6 illustrate the collapsible conveyor rack collapsed. At this time, the screw bolt 37 of the retracting unit 30 is supported in the notches 151 of the receiving support bars 15 and fastened to the screw hole 36.

Thus, the collapsible conveyor rack of the present invention described above has the characteristics of simple structure, facilitating quick operation, and significantly reducing space occupation when collapsed.

Further, the collapsible conveyor rack of the present invention can be variously embodied.

Further, two cover plates 80 can be used for covering the folding unit 20 and the retracting unit 30 respectively. In this case, it is not necessary to detach the cover plates 80 from the folding unit 20 and the retracting unit 30 in the collapsing operation. When the collapsible conveyor rack is collapsed, the two cover plates 80 are arranged in a stack.

Further, instead of the design of pivotally connecting the cover plate 80 to the bottom rack unit 10, the cover plate 80 can be pivotally connected to the folding unit 20 or the retracting unit 30, or alternatively, the cover plate 80 can be a separated member without being pivoted to any other component part.

Further, the driving mechanism 50 and the locking mechanism 60 can be integrated into one single unit that has the function of the driving mechanism and the function of the locking mechanism.

Further, the driving mechanism 50 is not limited the described design, a drive screw design, pneumatic cylinder or hydraulic cylinder can be used as a substitute to achieve the same effect. Further, electric drive, pneumatic drive or hydraulic drive can be used to substitute for the described manual drive.

Further, the locking mechanism 60 is not limited to what is described, other locking devices can be selected used as a substitute.

The invention uses the driving mechanism 50 for quick adjustment of the relative position between the folding unit 20 and the retracting unit 30, and the locking mechanism 60 for locking the relative position between the folding unit 20 and the retracting unit 30, and the receiving support bars 15 for supporting the retracting unit 30 positively in position.

In general, the invention utilizes the relative retractable design between the folding unit 20 and the retracting unit 30 to facilitate quick collapsing of the collapsible conveyor rack, significantly reducing the dimension of the collapsed conveyor rack. Since the conveyor can be kept in a loosen status when collapsible the collapsible conveyor rack, the collapsible conveyor rack can easily be collapsed, avoiding the problem of stretching deformation of the conveyor or conveyor interference in the collapsing operation.

What is claimed is:

1. A collapsible conveyor rack for supporting a conveyor, comprising:
    a bottom rack unit comprising a frame body and a pivot connector;
    a folding unit comprising a pivot connector pivotally connected to the said pivot connector of said bottom rack unit for allowing biasing of said folding unit relative to said bottom rack unit, a retractable portion connected to the said pivot connector of said folding unit, and a support unit supporting said retractable portion;
    a retracting unit comprising a retractable portion sleeved into said retractable portion of said folding unit in a way that said retractable portion of said retracting unit is linearly retractable relative to said retractable portion of said folding unit; and
    a driving mechanism driving said retracting unit to move relative to said folding unit, such that a length that said retracting unit protrudes over said folding unit is changed;
    wherein the retractable portion of said retracting unit comprises a bottom side and two lateral sides and the retractable portion of said folding unit comprises a bottom side and two lateral sides; the bottom side and the two lateral sides of the retractable portion of said retracting unit are slidably coupled onto inner surfaces of the bottom side and the two lateral sides of the retractable portion of said folding unit;
    wherein said driving mechanism is connected with the bottom side of the retractable portion of said retracting unit and the bottom side of the retractable portion of said folding unit.

2. The collapsible conveyor rack as claimed in claim 1, further comprising a locking mechanism for locking said retracting unit to said folding unit.

3. The collapsible conveyor rack as claimed in claim 2, wherein said bottom rack unit further comprises at least one receiving support bar mounted at said frame body for supporting said retracting unit.

4. The collapsible conveyor rack as claimed in claim 3, wherein each said receiving support bar comprises a notch; said retracting unit comprises a screw hole, and a screw bolt threaded into said screw hole to lock said retracting unit to said notch of each said receiving support bar.

5. The collapsible conveyor rack as claimed in claim 2, further comprising a cover plate covering said folding unit.

6. The collapsible conveyor rack as claimed in claim 1, further comprising a cover plate covering said folding unit.

7. The collapsible conveyor rack as claimed in claim 6, wherein said bottom rack unit further comprises at least one receiving support bar mounted at said frame body for supporting said retracting unit.

8. The collapsible conveyor rack as claimed in claim 7, wherein each said receiving support bar comprises a notch; said retracting unit comprises a screw hole, and a screw bolt threaded into said screw hole to lock said retracting unit to said notch of each said receiving support bar.

9. The collapsible conveyor rack as claimed in claim 1, wherein said bottom rack unit further comprises at least one receiving support bar mounted at said frame body for supporting said retracting unit.

10. The collapsible conveyor rack as claimed in claim 9, wherein each said receiving support bar comprises a notch; said retracting unit comprises a screw hole, and a screw bolt threaded into said screw hole to lock said retracting unit to said notch of each said receiving support bar.

\* \* \* \* \*